United States Patent [19]
Scott et al.

[11] 3,839,902
[45] Oct. 8, 1974

[54] PROBE FLOATING DEVICE

[75] Inventors: Timothy F. Scott, Fullerton; William E. Poindexter, Santa Ana, both of Calif.

[73] Assignee: Robertshaw Controls Company, Richmond, Va.

[22] Filed: Jan. 17, 1972

[21] Appl. No.: 218,061

[52] U.S. Cl.................................. 73/61 R, 73/19
[51] Int. Cl..................... G01n 11/00, G01n 33/18
[58] Field of Search............. 73/61 R, 53, 19, 170 A

[56] References Cited
UNITED STATES PATENTS
| 3,198,000 | 8/1965 | Schlageter | 73/19 |
| 3,214,964 | 11/1965 | Davis | 73/61 R X |

Primary Examiner—S. Clement Swisher
Assistant Examiner—Joseph W. Roskos
Attorney, Agent, or Firm—Fulwider, Patton, Rieber, Lee & Utecht

[57] ABSTRACT

A probe floating device including probe means carried in a float and projecting downwardly below the surface waterline of such float and including sensing means in the lower extremity thereof. An anti-fouling shield is carried by the float, is faired in with the sensing means, and forms a window for communication of liquid through the sensing means. Righting means is provided for weighting the lower side of the float to maintain the device normally upright whereby the float may be floated on rough liquid and the sensing means will be maintained submerged irrespective of the waves formed on such liquid.

13 Claims, 4 Drawing Figures

PATENTED OCT 8 1974 3,839,902

3,839,902

PROBE FLOATING DEVICE

BACKGROUND OF THE INVENTION

1. Field of the Invention

The present invention relates to a probe floating device for sensing the character of a large body of liquid by floating a sensor thereon.

2. Description of the Prior Art

It has been common practice to take samples from a large body of liquid, such as activated sewage sludge and test the character of such liquid by means of a sensor. However, such a procedure suffers the shortcoming that the results obtained are frequently inaccurate because of the time delay in obtaining the sample and because the rate of any activity in such liquid is frequently altered during taking of the sample. Great difficulty has been encountered in attempting to remedy the shortcomings of such procedure. For example, merely floating a probe on the liquid has been found to be ineffective because the sensing means in the probe frequently becomes rapidly fouled. Also, any roughness on the liquid surface frequently results in the probe becoming airborne as it leaves the top of a wave thus resulting in an erroneous reading.

SUMMARY OF THE INVENTION

The probe floating device of present invention is characterized by a buoyant float having a probe projecting vertically therethrough and terminating on its lower extremity in a sensor. The float is weighted sufficiently to maintain the sensor submerged as the float is propelled from the tops of waves. An anti-fouling shield fairs in with the sensor and is formed with a window for communication of liquid to the sensor. Thus, the sensor will be maintained continuously submerged irrespective of wave action, and the sensor will be maintained clean for accurate sensing.

The objects and advantages of the present invention will become apparent from a consideration of the following detailed description when taken in conjunction with the accompanying drawing.

DESCRIPTION OF THE PREFERRED EMBODIMENTS

Figure 3:
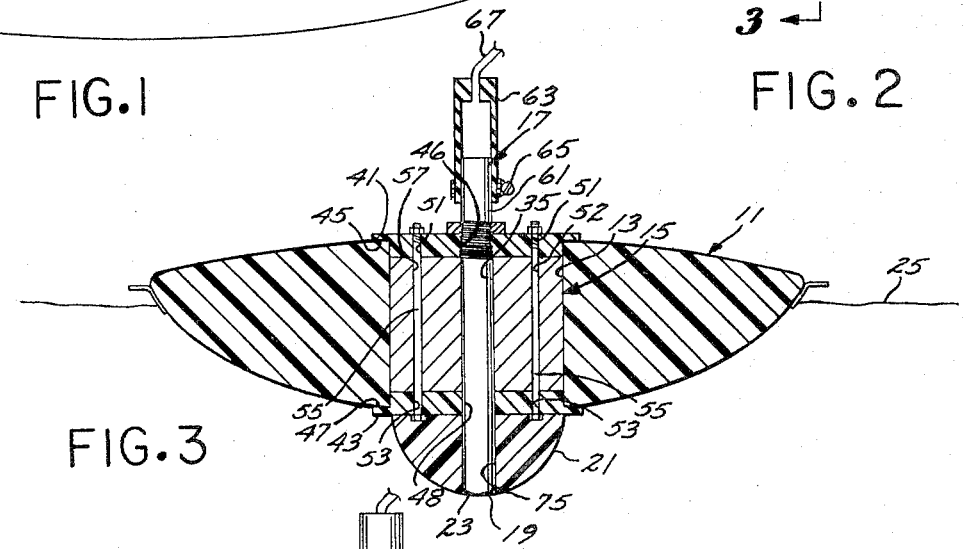
FIG. 3 is a vertical sectional view, in enlarged scale, taken along the line 3—3 of FIG. 2.

Referring to FIG. 3, the probe floating device of present invention includes, generally, a buoyant float 11 formed centrally with a through cavity 13 for receipt of a lead weight 15 which has a sensing probe 17 projecting vertically therethrough. The dissolved oxygen probe 17 is formed on its lower extremity with a sensor covered by a membrane 19 for passage of oxygen and a semi-spherical aluminum shield 21 faired in with such membrane 19 and forms a window 23 for communication of sewage 25 (FIG. 1) for sensing the partial pressure of oxygen dissolved therein.

In the treatment of sewage, it has become common practice to measure the rate at which oxygen is consumed to determine the rate of bacterial growth in the sewage. Naturally, taking samples from the sewage tank and testing thereof in the laboratory produces somewhat inaccurate results since the oxygen content thereof is altered continuously during removal of the sample from the sewage tank. Further, pumping of sewage through a conduit to a sensor also produces unsatisfactory results since the pumping mechanisms are frequently clogged by semi-solids and impurities in the sewage. Consequently, it is desirable to provide a probe floating device which will float the probe 17 near the surface of the sewage 25 and will maintain the sensor 19 submerged irrespective of waves on the surface of such sewage.

The float 11 is in the form of a plastic doughnut-shaped collar having a relatively large cross section in plan view to maintain the probe 17 erect with the sensing tip 19 submerged. A plurality of diametrically opposed mooring tabs 27 are formed on the periphery of the float 15 for securement to mooring lines 29 leading to the edge of the sewage tank 31.

The weight 15 is conveniently made of lead to provide relatively inexpensive weight means that has good working and forming characteristics. The lead weight 15 is in the form of a cylinder that closely fits the cylindrical opening 13 and has a through central vertical bore 35 for receipt of the probe 17.

The top and bottom ends of the central opening 13 are closed by circular polyvinyl chloride cover plates 41 and 43 which protect the lead weight 15 against direct contact with the sewage 25 to thus prevent such sewage from attacking and deteriorating such weight. The cover plates 41 and 43 are formed in their axially inner portions with reduced-in-diameter plugs that form shoulders 45 and 47 which abut the body of the float 11 and cooperate therewith to seal the opening 13 against entry of sewage and the like. The cover plates 41 and 43 are formed with respective bores 46 and 48 for receipt of the oxygen probe 17. The bore 46 is threaded for receipt of cooperating threads formed on such probe. The cover plates 41 and 43 are also each formed with a pair of through bores 51 and 53 for receipt of respective mounting bolts 55 which also project through respective bores 57 formed in the lead weight 15.

In the particular embodiment shown, the probe floating device incorporates a dissolved oxygen probe 17 which is available from New Brunswick Scientific Corporation under Model No. M 1016-0200. However, it will be realized that such probe floating device may be utilized with other commercially available dissolved oxygen probes and for sensing other parameters such as nitrate ions, chloride ions, and pH levels.

The dissolved oxygen probe 17 includes a waterproof housing 61 having a resilient cap 63 telescoped over its upper end and secured thereto by means of a hose clamp 65. A dual lead electrical cable 67 leads from the housing 61, through the top wall of the cap 63 and connects with a cable 71 leading to a monitor 73 (FIG. 1) to conduct electrical signals thereto.

The anti-fouling shield 21 is in the form of an aluminum semi-spherical ball 21 having a through central bore 75 for receipt of the lower extremity of the oxygen probe 17. Referring to FIG. 3, it is particularly important that the sensing tip 19 fairs in with the surface of the anti-fouling shield 21 to minimize collection of fouling semi-solids which would block communication of sewage to such sensing tip. The weight of the anti-fouling shield 21 combined with the weight of the lead weight 15 places the center of gravity of the entire probe floating device below the geometric center thereof to render such device stable in its upright position.

In operation, if the probe floating device of present invention is meant to be utilized to sense dissolved oxygen in sewage 25, a dissolved oxygen sensing probe 17 is installed in the central bore 35 as shown in FIG. 3. The cable 71 is then connected with the monitoring device 73, and the mooring lines 29 connected on one end with the mooring tabs 27 and the opposite end with the walls of the sewage tank 31. In many instances, as for example when the probe floating device is utilized in a lake, stream or river, it would be impractical to moor the float 11 from all four sides. In those situations the relatively large area, in plan, of the float 11 and weighting thereof by the lead weight 15 are particularly important to maintain the float 11 upright and the sensing tip 19 submerged. The float 11 will normally float sufficiently elevated to dispose the surface of the sewage 25 just below the tabs 27 as shown in FIG. 3.

The monitoring device 73 is then actuated and sewage passing the anti-fouling shield 21 will enter through the window 23 to be communicated to the sensing tip 19 to obtain a readout from the monitor 73 indicating the oxygen content in such sewage.

If the surface of the sewage 25 becomes disturbed, as by winds blowing thereacross, agitation thereof, or pumping of sewage into the tank 31, waves formed on the surface of such sewage will buoy the float 11 upwardly on the crest of each wave. However, due to the concentrated weight afforded by the lead weight 15, the upward impetus provided by any normal such wave will not provide sufficient vertical acceleration to propel the total probe floating device from the surface of the sewage. Thus, the sensing tip 19 is maintained submerged to provide a continuous accurate readout on the monitor 73. Additionally, the smooth continuous surface provided by fairing in of the sensing tip 19 with the surface of the anti-fouling shield 21 prevents collection of semi-solids and impurities which would otherwise attach to the underside of the probe floating device to clog the sensing membrane and interfere with the communication of sewage to such sensing tip.

Figure 1:
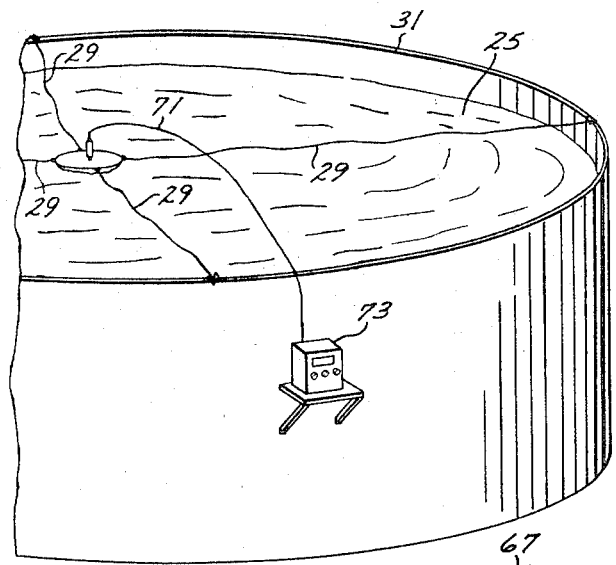
FIG. 1 is a perspective view of a sewage tank having a probe floating device embodying the present invention floating thereon.
Figure 2:
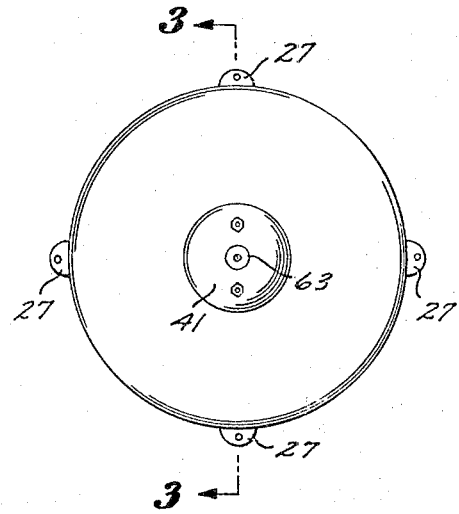
FIG. 2 is a top plan view, in enlarged scale, of the probe floating device shown in FIG. 1.
Figure 4:
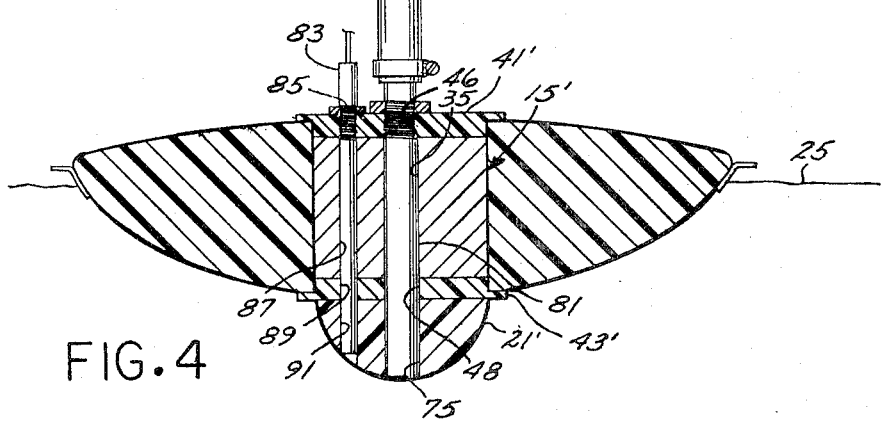
FIG. 4 is a vertical sectional view similar to FIG. 3 of a second embodiment of the probe floating device of present invention.

The probe floating device shown in FIG. 4 is substantially the same as that shown in FIG. 1 except that it floats a specific ion probe 81 and a reference probe 83. The specific ion probe 81 is received in central bores 35, 46, 48 and 75 formed in the respective cap 41', weight 15', cap 43' and anti-fouling shield 21'.

Off-center aligned bores 85, 87, 89 and 91 are formed in the respective cap 41', weight 15', cap 43', and anti-fouling shield 21' for receipt of the reference probe 83.

Operation of the probe floating device shown in FIG. 4 is substantially the same as that for the probe floating device shown in FIG. 1 except that the specific ion probe 81 and reference probe 83 cooperate to measure the specific ion concentration of the liquid tested.

From the foregoing, it will be apparent that the probe floating device of present invention provides a convenient and rapid means for obtaining a reliable indication of various characteristics of a liquid and assures that the sensing probe is maintained erect and submerged irrespective of normal disturbances on the liquid surface.

Various modifications and changes may be made with regard to the foregoing detailed description without departing from the spirit of the present invention.

What is claimed is:

1. A probe floating device comprising:
float means for floating in an erect position on liquid to be monitored and including a normally submerged streamlined shielding surface formed with a communication window, said float means being stabilized to be normally maintained in an erect position;
probe means received by said float means and including sensing means terminating in an end disposed in said window; and
probe mounting means in said float means and mounting said probe means with said sensing means projecting into said window and said end substantially fared in with said streamlined shielding surface whereby said device may be floated on rough liquid for monitoring thereof by said sensing means and liquid washing past said shielding surface and end of said probe will maintain said end washed clear for contact with said liquid for monitoring thereof by said sensing means.

2. A probe floating device as set forth in claim 1 for use in a liquid having a predetermined chemical character and that includes:
said device includes weight means reactable with liquid having said predetermined chemical character and
covering means for covering to said weight means against contact by said liquid.

3. A probe floating device as set forth in claim 2 wherein:
said float is made of a material that is passive with liquid of said predetermined chemical character.

4. A probe floating device as set forth in claim 1 wherein:
said float projects downwardly and is formed with a rounded exterior surface.

5. A probe floating device as set forth in claim 1 that includes:
righting means including lead weight means and wherein;
said shield is made of a material that is substantially passive to activated sewage sludge; and
said device includes cover means for covering said lead weight means to prevent contact with said liquid.

6. A probe floating device as set forth in claim 1 that includes:
holding means carried on said float means for connection with a mooring line.

7. A probe floating device as set forth in claim 1 wherein:
said float is formed with a second window and said device includes;
second probe means including sensing means disposed adjacent said second window.

8. A probe floating device as set forth in claim 1 for use with a liquid having a predetermined chemical character and wherein:

said float means is made of a material which is passive to liquid of said predetermined chemical character and is formed with a through opening;

said device includes weight means that reacts with liquid of said predetermined chemical character and said device includes;

cover means covering the opposite ends of said opening to isolate said weight means from said liquid.

9. A probe floating device as set forth in claim 1 that includes:

cap means for covering the end of said probe opposite said sensing means; and sealing means for sealing said cap to said probe.

10. A probe floating device as set forth in claim 1 that includes:

signal conducting means connected with said probe means.

11. A probe floating device as set forth in claim 1 wherein:

said float is formed to normally dispose the center of gravity of said device below the level of the surface of said liquid when said float is floating in its erect position.

12. A probe floating device as set forth in claim 1 wherein:

said float means is relatively buoyant; and said device includes relatively dense weight means having its center of gravity disposed below the level of the surface of said liquid.

13. A probe floating device as set forth in claim 1 that includes:

an anti-fouling shield mounted on the underside of said float means and formed on its underside with said shielding surface.

* * * * *